Patented Nov. 5, 1940

2,220,116

UNITED STATES PATENT OFFICE 2,220,116

PRODUCTION OF CADMIUM COLORS

James J. O'Brien, Baltimore, Md., assignor to The Glidden Company, Cleveland, Ohio, a corporation of Ohio No Drawing. Application January 29, 1938, Serial No. 187,665

12 Claims. (Cl. 134—58)

The present invention relates to the production of cadmium colors such as cadmium red and cadmium yellow. More particularly, the invention relates to a process whereby the color of cadmium pigments is improved or increased, or alternatively whereby the amount of expensive ingredients can be reduced without reduction in the quality of the pigment.

In the process of making cadmium sulfide pigments one of the chief raw materials is cadmium sulfate. As this salt is hard to obtain in the pure form and as the pure cadmium metal is readily obtainable, it is customary to form cadmium sulfate solution by attacking the metal with sulfuric acid. The cadmium sulfate formed can then be reacted with barium sulfide or barium sulfo-selenide for the production of cadmium lithopones. Other water soluble sulfides, such as sodium sulfide may be used, if desired in lieu of barium sulfide.

It is known that if nitric acid is added to sulfuric acid employed to dissolve metals that the rate of dissolution is accelerated. It has been found, however, that if the amounts of nitric acid and cadmium are properly controlled, that in addition to the accelerated dissolution, new and unexpected results are obtained in improvements in the color and consequent saving in the cost of the pigments resulting from the use of the cadmium sulfate solution so prepared.

It is, accordingly, an object of this invention to provide an improved process for the production of cadmium sulfide pigments.

Another object of the invention is to provide a process whereby the color of cadmium lithopone pigments is improved.

Another object is to provide a process whereby the amounts of certain expensive ingredients in cadmium lithopones can be reduced without reduction in the color standard.

A further object is to provide an improved process for preparing a cadmium sulfate solution.

Another object is to provide a cadmium sulfate solution giving improved results in the preparation of cadmium sulfide pigments.

Other objects will appear from the description of the invention to follow.

It has been found that the presence of nitrates during the calcination of the cadmium sulfide pigment has a desirable effect on the color of the finished pigment by causing a brightening of the colors with an increase in the tinting strength of the pigment. It has been found further that nitrates originating during the dissolution of the cadmium metal by sulfuric acid give better results than nitrates added to the cadmium sulfate liquor or to the calcination charge.

In the preferred manner of carrying out the invention, the cadmium metal is treated with sulfuric acid containing nitric acid in an amount such that upon completion of the reaction, nitrates are present in the cadmium sulfate liquor. By using an excess of nitric acid, the nitric acid is reduced by the cadmium and forms hydroxylamine ($NH_3O$). Hydroxylamine, like ammonia, reacts with water to form hydroxylamine hydroxide ($NH_4O.OH$), which in turn reacts with excess nitric acid to form hydroxylamine nitrate ($NH_4O.NO_3$).

It is preferred also to use an excess of cadmium metal so that the cadmium sulfate solution is neutral to methyl orange. If the solution is acid to methyl orange it is necessary to neutralize with alkalies, which is expensive, and also results in complications caused by the formation of basic cadmium compounds and soluble alkali metal sulfates. Moreover, in the presence of excess cadmium metal, hydroxylamine hydroxide helps in making the cadmium sulfate neutral to methyl orange. Accordingly, instead of originally adding an excess of nitric acid, it is possible to add to the cadmium sulfate solution containing an excess of metal and which solution is neutral to methyl orange, a small amount of nitric acid without destroying the neutrality of the solution to methyl orange. Under such condition hydroxylamine nitrate is likewise formed.

In place of the hydroxylamine nitrate, it has been found that other amine nitrates such as ammonium nitrate produce improved results in the color of the pigment when added to the nitrate free cadmium sulfate liquor. The salt may likewise be added to the calcination charge. The results in these cases are not, however, as good as in the case in which the nitrate is formed in the attack boxes during the preparation of the cadmium sulfate liquor.

Any other amine nitrate may be used, however. Also any nitrate that is completely volatilized during the calcination, or any nitrate that does not leave a residue or does not combine with the pigment during calcination may be used. At present it is supposed that the volatile nitrates act as catalysts, speeding up the reaction, causing a non-oxidizing atmosphere or at least a partially reducing atmosphere but not combining with or reacting with the pigment during calcination.

Example I

Cadmium sulfate liquor was prepared by attacking cadmium metal with a mixture of sulfuric acid and nitric acid in the following amounts:

| | | |
|---|---|---|
| Cadmium metal | lbs | 4000 |
| Nitric acid (42° Baumé) | gal | 85 |
| Sulfuric acid (60° Baumé) | gal | 243.75 |
| Water | gal | 1125 |

Upon the completion of the reaction, the liquor was purified by treatment with potassium permanganate to take out manganese and iron. The purified solution contained nitrates in solution and was neutral to methyl orange. The purified liquor was then standardized at 35° Baumé and reacted with barium sulfo-selenide as follows:

| | | |
|---|---|---|
| $CdSO_4$ liquor (35° Baumé) | gal | 272.5 |
| BaS.Se solution (15.5° Baumé) | gal | 600.0 |

After filtering, washing, grinding, and calcining, it was found that the red pigment produced had a much deeper color than that prepared using a cadmium sulfate liquor free from nitrates. By reducing the amount of selenium used in the barium sulfo-selenide solution 10%, the same color was produced as was produced without the use of excess nitric acid in the preparation of the cadmium sulfate solution without weakening of the tinting strength below the standard.

Another advantage is that the free selenium present is removed, as evidenced by the absence of black spots of free selenium which are present when no excess of nitric acid is used.

Example II

In this example, barium sulfide was reacted with the purified cadmium sulfate liquor of Example I as follows:

| | | |
|---|---|---|
| $CdSO_4$ (35° Baumé) | gal | 266 |
| BaS solution (15.5°) Baumé | gal | 710 |

The precipitate was filtered, washed, ground, and calcined in the usual manner to produce a yellow cadmium lithopone.

It is sometimes customary to mix the yellow cadmium lithopone with blanc fixè. A slurry of the yellow pigment made according to the above procedure was prepared and blanc fixè added. It was found that more blanc fixè could be added to the yellow pigment prepared from the cadmium sulfate containing nitrates than could be added to the yellow pigment prepared without the presence of nitrates and still produce the same results.

It is thought that the action of the nitrates is due to a reducing action. Hydroxylamine nitrate is a reducing agent, and it is thought that it forms reducing gases in the calciner producing at least a partially reducing atmosphere, thereby brightening the color of the pigment. It is probable also that the hydroxylamine nitrate or other nitrate acts directly on the pigment itself in some way to make it brighter. The increased tinting strength is not due to cadmium nitrate, as the ratio of barium sulfate to cadmium sulfide is the same whether nitrates are present or not in the cadmium sulfate liquor. For example, in the reds a high tinting strength might indicate a high CdSSe percent formed from the possible presence of $Cd(NO_3)_2$ but according to analysis the ratio of CdSSe to $BaSO_4$ is the same as pigment made from nitrate free cadmium sulphate.

While certain examples have been given illustrating the invention and certain explanations have been given, it is to be understood that the invention is not limited to the details given. Other nitrates than those mentioned may be used. Any nitrate which will be volatilized in the calciner can be used and it may be introduced in any manner prior to the calcination of the pigment. The invention is applicable to the preparation of cadmium sulfide pigments generally, including the pure sulfide pigments, cadmium lithopones and various composite cadmium sulfide pigments.

Wherever the term "excess metal" is used in the specification and claims it is used to mean a sufficient amount of metal such that a solution neutral to methyl orange containing no free acid results after all of the metal is dissolved which is going to be dissolved.

Wherever the term "excess nitric acid" is used it is used to mean a sufficient amount of nitric acid is used to produce nitrates in the solution after neutrality to methyl orange is reached and there is no free acid present and after all of the metal has dissolved which is going to be dissolved.

I claim:

1. In the production of cadmium sulfide pigments the step comprising calcining the pigment in a calcination zone in an atmosphere which is at least partially reducing and produced by the volatilization of a volatile nitrate.

2. In the production of cadmium sulfide pigments the step comprising calcining the pigment in a calcination zone in an atmosphere which is at least partially reducing and produced by the volatilization of an amine nitrate.

3. In the production of cadmium sulfide pigments the steps which comprise incorporating a volatile nitrate with the pigment at any stage in the manufacture thereof up to and including the calcination step and calcining the pigment in the presence of the volatile nitrate.

4. In the production of cadmium sulfide pigments the steps comprising introducing an amine nitrate with the pigment at any stage in the manufacture thereof and calcining the pigment in the presence of the amine nitrate.

5. In the production of cadmium sulfide pigments the step which comprises calcining the pigment in an atmosphere which is at least partially reducing and containing the volatilization products of hydroxylamine nitrate.

6. In the production of cadmium sulfide pigments the step which comprises calcining the pigment in an atmosphere which is at least partially reducing and containing the volatilization products of ammonium nitrate.

7. The process of preparing a cadmium sulfide pigment which comprises reacting an aqueous cadmium sulfate solution containing a volatile nitrate with a water soluble sulfide to precipitate a crude cadmium sulfide pigment containing a volatile nitrate and calcining the crude pigment.

8. The process of claim 7 in which the volatile nitrate is an amine nitrate.

9. The process of preparing a cadmium sulfide pigment which comprises reacting an aqueous cadmium sulfate solution containing hydroxylamine nitrate with a water soluble sulfide, recovering the resulting crude pigment containing hydroxylamine nitrate and calcining the crude pigment.

10. The process of preparing a cadmium sulfide lithopone which comprises reacting an aqueous cadmium sulfate solution containing hydroxylamine nitrate with barium sulfide, recovering the resulting crude cadmium lithopone containing hydroxylamine nitrate and calcining the crude pigment.

11. The process of preparing a cadmium sulfide pigment which comprises dissolving cadmium metal with aqueous sulfuric acid and sufficient nitric acid to form hydroxylamine nitrate during the dissolution, reacting the resulting solution with barium sulfide, recovering the crude pigment containing hydroxylamine nitrate and calcining the crude pigment.

12. The process of preparing a cadmium sulfide pigment which comprises treating cadmium metal with a mixture of sulfuric and nitric acids in aqueous solution to form an aqueous cadmium sulfate solution, the amounts of cadmium metal and nitric acid being such that after all of the metal is dissolved which is going to be dissolved the solution will be neutral to methyl orange, contain no free acid and will contain nitrates in solution, reacting the resulting solution with barium sulfide, recovering the resulting crude pigment containing hydroxylamine nitrate, and calcining the crude pigment.

JAMES J. O'BRIEN.